United States Patent
Casaregola et al.

(10) Patent No.: US 12,474,894 B2
(45) Date of Patent: Nov. 18, 2025

(54) METHOD AND SYSTEM FOR PROVIDING STATIC AND DYNAMIC INPUTS AND ADVANCED LOGGING CAPABILITIES IN APPLICATION DEVELOPMENT SYSTEMS

(71) Applicant: ADP, Inc., Roseland, NE (US)

(72) Inventors: Claire Casaregola, New York, NY (US); Yair Pike, San Francisco, CA (US); Harini Satyanarayanan, New York, NY (US); Michael Greene, Seattle, WA (US); Lauren Miller, New York, NY (US)

(73) Assignee: ADP, Inc., Roseland, NJ (US)

( * ) Notice: Subject to any disclaimer, the term of this patent is extended or adjusted under 35 U.S.C. 154(b) by 260 days.

(21) Appl. No.: 18/211,272

(22) Filed: Jun. 18, 2023

(65) Prior Publication Data
US 2023/0333823 A1 Oct. 19, 2023

Related U.S. Application Data

(63) Continuation of application No. 17/378,027, filed on Jul. 16, 2021, now abandoned.

(51) Int. Cl.
*G06F 8/34* (2018.01)
*G06F 3/04817* (2022.01)
(Continued)

(52) U.S. Cl.
CPC ............ *G06F 8/34* (2013.01); *G06F 3/04817* (2013.01); *G06F 3/0482* (2013.01);
(Continued)

(58) Field of Classification Search
CPC ............... G06F 3/0482; G06F 3/04817; G06F 3/04847; G06F 3/0486; G06F 8/34; G06F 40/274
See application file for complete search history.

(56) References Cited

U.S. PATENT DOCUMENTS

| | | |
|---|---|---|
| 10,970,050 B1 | 4/2021 | Pike et al. |
| 2003/0093253 A1 | 5/2003 | Freyensee et al. |

(Continued)

FOREIGN PATENT DOCUMENTS

WO WO-2021174221 A1 * 9/2021 ............. H04L 41/16

OTHER PUBLICATIONS

Anonymous, "Low-code development platform", Wikipedia, https://en.wikipedia.org/wiki/Lowcode_development_platform, accessed Apr. 6, 2021, 5 pages.

(Continued)

*Primary Examiner* — Ziaul A Chowdhury
(74) *Attorney, Agent, or Firm* — Foley & Lardner LLP

(57) ABSTRACT

A method for providing a user interface in a low-code or no-code development platform includes generating, by a computing system, a graphic user interface of an application development program. The graphic user interface includes: a first area including a list of blocks; a second area including a structured data object comprising nodes corresponding to one or more of the blocks; and a third area including a parameter field of a selected one of the nodes, wherein the parameter field is configured to receive user input defining both a static string and a dynamic variable.

16 Claims, 10 Drawing Sheets

(51) Int. Cl.
    *G06F 3/0482* (2013.01)
    *G06F 3/04847* (2022.01)
    *G06F 3/0486* (2013.01)
    *G06F 40/274* (2020.01)

(52) U.S. Cl.
    CPC ........ *G06F 3/04847* (2013.01); *G06F 3/0486* (2013.01); *G06F 40/274* (2020.01)

(56) References Cited

U.S. PATENT DOCUMENTS

| | | | |
|---|---|---|---|
| 2004/0119754 A1* | 6/2004 | Bangalore | G06F 3/04847 715/809 |
| 2007/0169037 A1* | 7/2007 | Subramanian | G06F 9/451 717/135 |
| 2007/0171046 A1 | 7/2007 | Diem | |
| 2008/0092111 A1 | 4/2008 | Kinnucan et al. | |
| 2008/0127052 A1 | 5/2008 | Rostoker | |
| 2011/0078617 A1* | 3/2011 | Kumagai | G06F 40/174 715/780 |
| 2011/0138291 A1 | 6/2011 | Twiddy et al. | |
| 2014/0324963 A1 | 10/2014 | Sankar et al. | |
| 2020/0089797 A1* | 3/2020 | Rosen | G06F 11/3684 |
| 2021/0096828 A1 | 4/2021 | Pike et al. | |
| 2021/0096829 A1 | 4/2021 | Pike et al. | |
| 2021/0389962 A1* | 12/2021 | Li | G06F 9/44505 |
| 2022/0292160 A1* | 9/2022 | Mehta | G06F 16/972 |

OTHER PUBLICATIONS

Anonymous, "String Concatenation and Formatting", https://www.pythonforbeginners.com/concatenation/string-concatenation-and-formatting-in-python, Dec. 2, 2020, 9 pages.

Erica N., "JavaScript Basics: String Concatenation with Variables and Interpolation", https://endubuezeOO.medium.com/javascripl-basics-string-concatenation-with-variables-and-interpolation-deba239debbe#:-:text=In, Dec. 11, 2019, 3 pages.

Magner et al., "How to concatenate multiple strings {C# Guide}", https://docs.microsoft.com/en-us/dolnel/csharp/howo/concatenate-multiple-strings, Feb. 20, 2018, 4 pages.

US Office Action issued in corresponding U.S. Appl. No. 17/378,027, dated Jul. 12, 2022 (16 pages).

US Office Action issued in corresponding U.S. Appl. No. 17/378,027, dated Mar. 17, 2023 (21 pages).

* cited by examiner

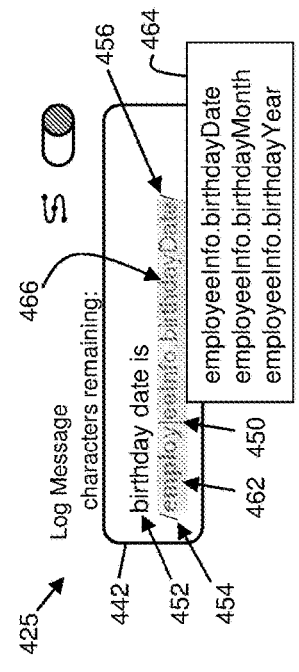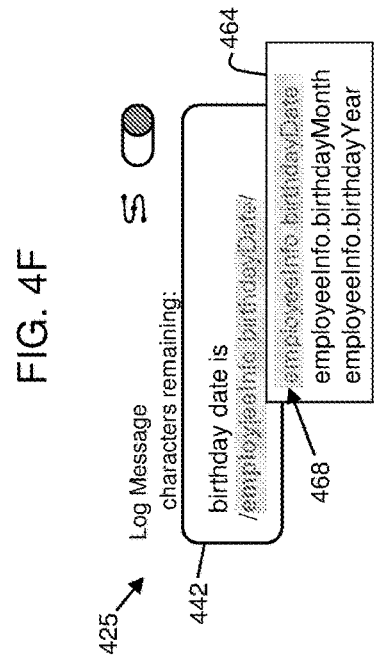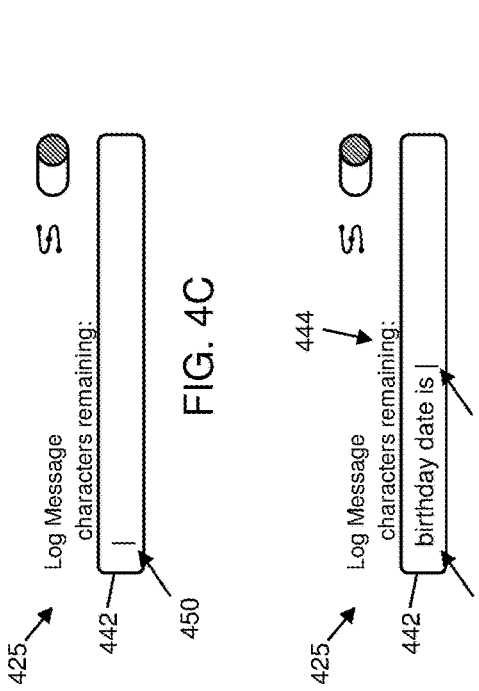

METHOD AND SYSTEM FOR PROVIDING STATIC AND DYNAMIC INPUTS AND ADVANCED LOGGING CAPABILITIES IN APPLICATION DEVELOPMENT SYSTEMS

The present application claims the benefit of priority under 35 U.S.C. § 120 as a continuation of U.S. patent application Ser. No. 17/378,027, filed Jul. 16, 2021 and titled "METHOD AND SYSTEM FOR PROVIDING STATIC AND DYNAMIC INPUTS AND ADVANCED LOGGING CAPABILITIES IN APPLICATION DEVELOPMENT SYSTEMS," the contents of which are incorporated herein by reference in their entirety.

TECHNICAL FIELD

The present disclosure relates generally to application development systems and, more particularly, to a method and system for providing static and dynamic inputs and advanced logging capabilities in application development systems.

BACKGROUND

Currently, when a new computer program is desired, a trained programmer uses one or more specialized computer languages to create code. Code instructs a computer to perform a desired function.

In most cases, even for simple programs, the programmer must have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and, for some individuals, beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

Low-code and no-code (codeless) development platforms provide a mechanism for users to create programs (e.g., applications) without having specific knowledge of a programming language. Low-code and no-code development platforms typically operate by permitting the user to drag and drop visual objects in a graphic user interface, with the platform automatically creating coding in the programming language based on the user inputs at the user interface.

Some objects used in the user interface (UI) of low-code and no-code development platforms include parameter fields where the user inputs data in the form of either a static string or a dynamic variable. To facilitate the user-perceived codeless nature of the UI, a user is required to navigate through a modal in the UI to select a variable in a parameter field, and this is time consuming.

SUMMARY

In a first aspect of the present disclosure, there is a method of providing a user interface in a low-code or no-code development platform. The method includes generating, by a computing system, a graphic user interface of an application development program. The graphic user interface includes: a first area including a list of blocks; a second area including a structured data object comprising nodes corresponding to one or more of the blocks; and a third area including a parameter field of a selected one of the nodes, wherein the parameter field is configured to receive user input defining both a static string and a dynamic variable.

In another aspect of the present disclosure, there is a computer program product for providing a user interface in a low-code or no-code development platform. The computer program product includes one or more computer readable storage media having program instructions collectively stored on the one or more computer readable storage media. The program instructions are executable to generate a graphic user interface of an application development program, wherein the graphic user interface includes: a first area including a list of blocks; a second area including a structured data object comprising nodes corresponding to one or more of the blocks; and a third area including a parameter field of a selected one of the nodes, wherein the parameter field includes an introductory character and a closing character indicating that the parameter field is configured to receive only user input defining a dynamic variable In a further aspect of the present disclosure, there is a computer system for providing a user interface in a low-code or no-code development platform. The system includes a processor, a computer readable memory, one or more computer readable storage media, and program instructions collectively stored on the one or more computer readable storage media. The program instructions are executable to generate a graphic user interface of an application development program, wherein the graphic user interface includes: a first area including a list of blocks; a second area including a structured data object comprising nodes corresponding to one or more of the blocks; and a third area including a parameter field of a selected one of the nodes, wherein the parameter field is configured to receive user input defining both a static string and a dynamic variable.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIGS. 4A through 40, 5A, and 5B illustrate aspects of a user interface in accordance with aspects of the present disclosure.

FIGS. 6 and 7 depict exemplary flows for processes in accordance with aspects of the present disclosure.

DETAILED DESCRIPTION OF ASPECTS OF THE INVENTION

Figure 1:
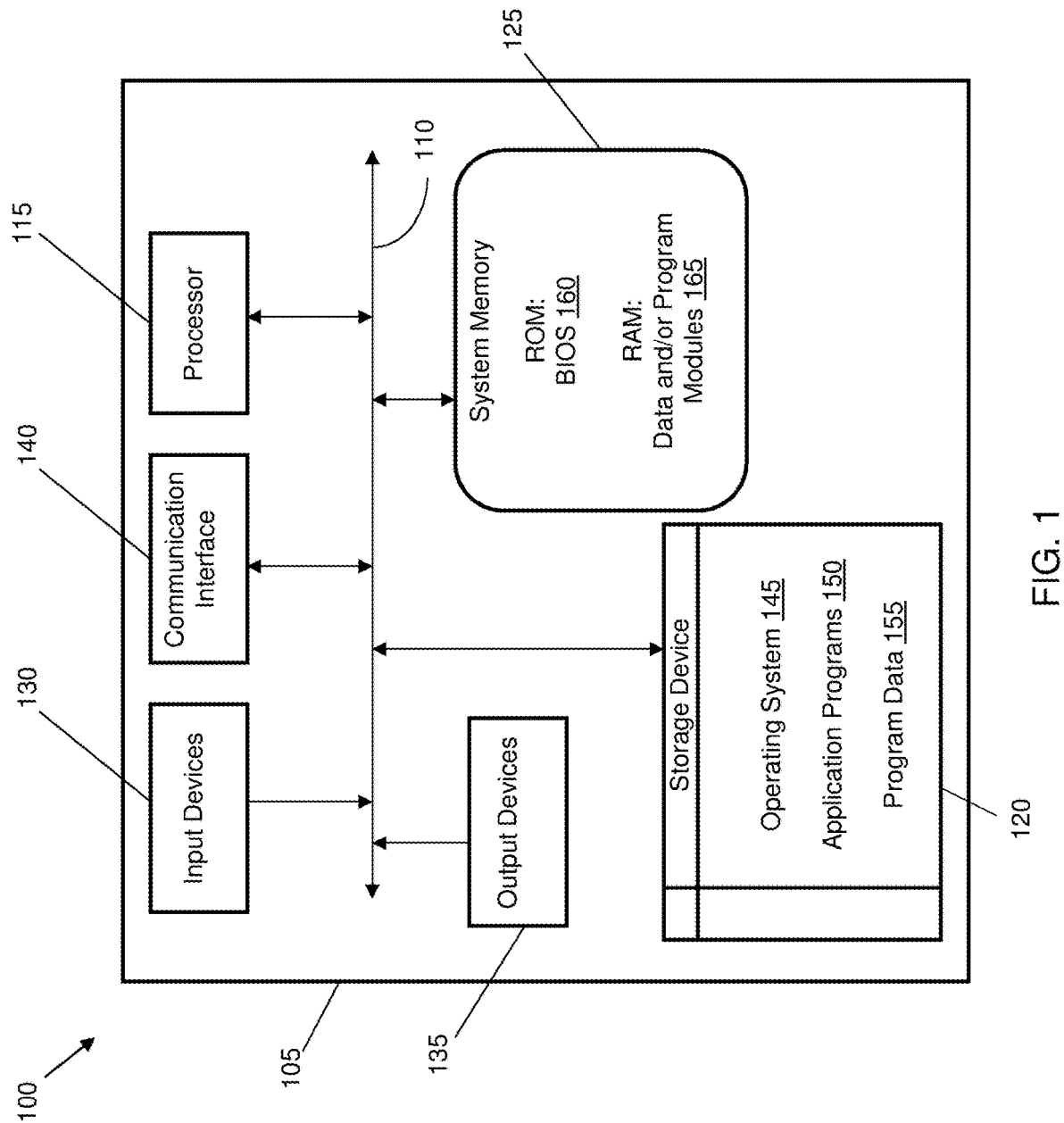
FIG. 1 is an illustrative architecture of a computing system implemented in embodiments of the present disclosure.

The present disclosure relates generally to application development systems and, more particularly, to a method
} and system for providing static and dynamic inputs and advanced logging capabilities in application development systems. In accordance with aspects of the present disclosure, a low-code or no-code development platform includes parameter fields that permit a user (e.g., an application developer) to input both static strings and dynamic variables in a single parameter field. Implementations also provide the user with the ability to selectively disable and re-enable logs for stages of an application.

In conventional low-code and no-code development platforms, parameter fields are configured such that a user must choose to enter either a static string or a dynamic variable into a parameter field. The parameter fields are defined in the development platform to expect only one of a static string and a dynamic variable, and the user cannot deviate from this definition. This is disadvantageous in some situations, for example, where the user's workflow would benefit from being able to combine both a static string and a dynamic variable into a single parameter field. One such scenario is adding logs to a Logiflow (e.g., logic document) on the platform. Having to choose between a string and a variable in a parameter field is limiting because sometimes a variable without context is difficult to understand. Moreover, forcing users to navigate to a modal to select variables is time consuming, especially if the user knows in advance which variable they intend to select in a parameter field.

Another issue that is present in conventional low-code and no-code development platforms is the inability to selectively turn logs on and off for stages of an application. When debugging an application using logs, there are times when the user is unconcerned with log outputs for certain stages of the application. The user has no ability, however, to turn off the log for the stages that are of no concern. When this is the case, the log is cluttered with information that is not relevant to the user. Moreover, when a log is completely deleted, the user must build the log from scratch again in the future if the user needs the log at a later date.

Advantageously, aspects of the present disclosure address these issues by providing one or more features that allow users to enter both static strings and dynamic variables into a single parameter field. In implementations, by typing regularly in a parameter field, the user creates a string message in the parameter field. In implementations, to input a variable in the parameter field, the user either selects a dedicated button (or other dedicated operation) to open a modal for the variable or types an introductory character in the parameter field. Opening the modal permits the user to search for and select one or more variables. In embodiments, typing the introductory character in the parameter field automatically causes a closing character to appear in the parameter field, and the user then types between the introductory character and the closing character to dynamically search for and select one or more variables. In this manner, a user may quickly find and select a variable without having to navigate a modal, which can be time consuming.

In some embodiments, the parameter field may be constrained to receive only a variable and to not receive a string (i.e., the combination of a string and variable is invalid). In these embodiments, the introductory character and the closing character are automatically displayed in the parameter field without the need for the user to type the introductory character. In these embodiments, to input a variable in a particular parameter field, the user either clicks a dedicated button to open a modal for selecting one or more variables, or begins typing between the introductory character and the closing character to dynamically search for and select one or more variables. In this manner, it is made clear to the user which parameter fields accept both static strings and dynamic variables, and which parameter fields accept only dynamic variables, and this clarity enhances the user experience when working with this new functionality.

Additional aspects of the present disclosure provide features that allow users to select a toggle switch (or other activation method) to activate or deactivate a log for a stage of an application being developed in the development platform. In embodiments, by toggling the switch to the OFF position, a log is saved but does not appear in the log table. To reactivate the log, the user may toggle the switch to the ON position.

Accordingly, implementations of the disclosure provide an improvement to the technical field of application development systems, in particular low-code and no-code development platforms. The ability to combine static strings and dynamic variables into a single parameter field is not present in conventional low-code and no-code development platforms, and this ability improves the efficiency of users using the development platform. Implementations of the disclosure provide an additional improvement to this technical field by improving the user experience in such development platforms by clearly indicating which parameter fields accept both static strings and dynamic variables, and which parameter fields accept only dynamic variables. Implementations of the disclosure provide further improvement to this technical field by providing users the ability to selectively deactivate logs for certain stages of an application, which improves a user's efficiency during debugging of the application.

Implementations of the present disclosure may be a system, a method, and/or a computer program product. The computer program product may include a computer readable storage medium (or media) having computer readable program instructions thereon for causing a processor to carry out aspects of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
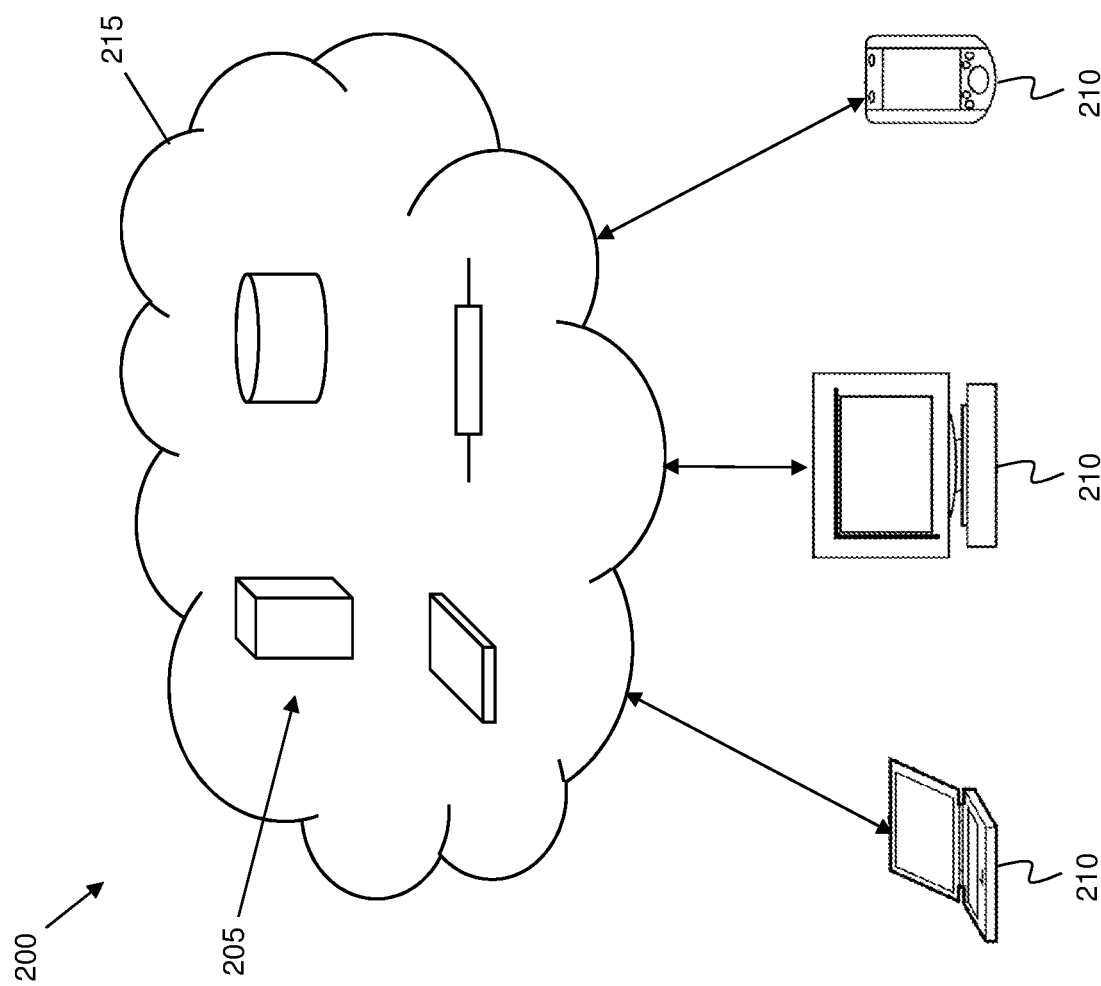
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example, processor 115 enables the computing device 105 to provide static and dynamic inputs and advanced logging capabilities in application development systems.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to provide one or more features that allow users to enter both static strings and dynamic variables into a single parameter field. The computing system may be configured to provide one or more features that allow users to click a toggle switch to activate or deactivate a log for a stage of an application being developed in a development platform. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
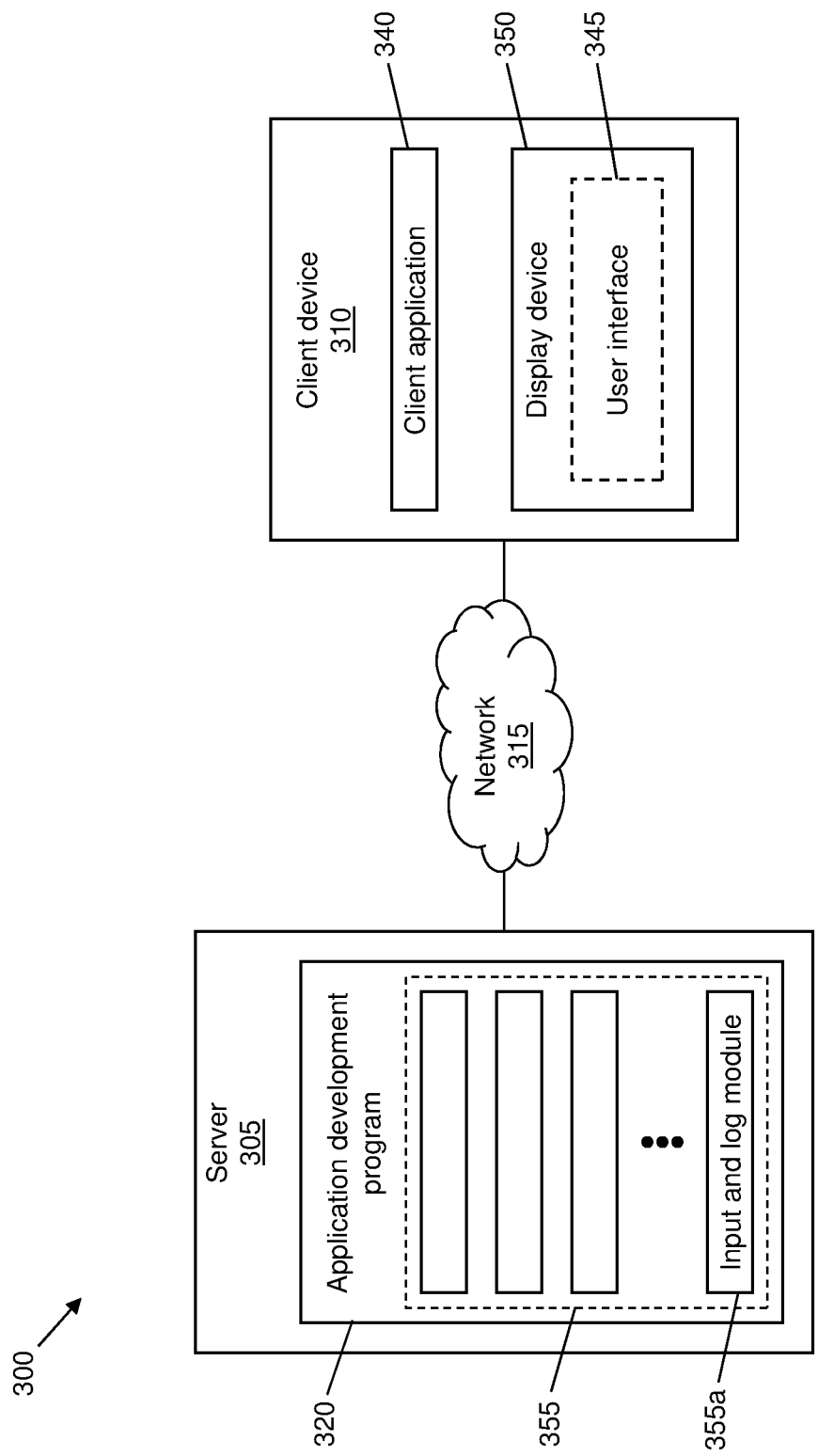
FIG. 3 shows a block diagram in accordance with aspects of the present disclosure.

FIG. 3 shows a block diagram in accordance with aspects of the present disclosure. More specifically, FIG. 3 shows a functional block diagram of an exemplary environment 300 that illustrates functionality of aspects of the present disclosure.

As shown in FIG. 3, the environment 300 includes a server 305 and a client device 310 connected to a network 315. The client device 310 comprises a computing device including one or more elements of computing device 105 of FIG. 1, and may include a desktop computer, laptop computer, tablet computer, or smartphone, for example. In one example, a user (e.g., an application developer) utilizes the client device 310 to access an application development program that is provided by the server 305. The network 315 includes one or more communications networks such as one or more of a LAN, WAN, and the Internet. The server 305 comprises one or more servers including one or more elements of computing device 105 of FIG. 1. In a cloud implementation, the network 315 comprises the network 215 of the cloud computing environment 200 of FIG. 2, the client device 310 comprises one of the client devices 210 shown in FIG. 2, and the server 305 comprises one or more cloud resources 205 of FIG. 2.

In embodiments, the server 305 runs an application development program 320 that is configured to communicate with a client application 340 running on the client device 310 to permit a user to utilize the client application 340 to create software applications without the user having to code any of the software being developed. In embodiments, the application development program 320 and the client application 340 communicate with one another to display one or more working areas in a graphical user interface (UI) 345 that is displayed on a display device 350 of the client device 310. In embodiments, the application development program 320 and the client application 340 cooperate to enable users with little or no background in computer software development to simply drag-and-drop tiles (also called blocks) that contain prebuilt features onto a canvas and start building applications in the UI 345.

In embodiments, each tile corresponds to a set of data nodes that are composable structured data objects according to a domain-specific language. In one example, sets of tiles are displayed within a first area of the UI 345 and one or more drop zones are displayed in a second area of the UI 345. In this example, dragging a selected tile from the first area to a drop zone within the second area appends the corresponding set of data nodes into a structured data object according to the domain-specific language. In this manner, the application development program 320 provides the user with the ability to create software applications in what the user perceives as a low code or no code development environment by manipulating the tiles shown in the UI 345.

As further shown in FIG. 3, the application development program 320 may comprise plural modules 355 configured to perform respective functions of the application development program 320. Each of the modules 355 may comprise one or more program modules such as program modules 165 described with respect to FIG. 1. In one example, the modules 355 include a tile renderer module, a data and metadata binding module, and a business rule and workflow module, a user interface engine orchestrator, a metadata engine, a persistence engine, a business rule engine, a workflow engine, and a user interface test engine, as described in U.S. Patent Application Publication No. 2021/0096828, the contents of which are expressly incorporated by reference herein in their entirety.

Each of the modules 355 may be stored and run at the server 305. Alternatively, one or more of the modules 355 may be run at the client device 310. In one example, all of the modules 355 run at the server 305, and the client application 340 comprises a browser application that receives data from the various modules 355 and presents a visual display in the UI 345 based on the data received from the modules 355. In another example, a first subset of the modules 355 runs at the client device 310 and a second subset of the modules 355 runs at the server 305. For example, the client device 310 may run a tile renderer module, a data and metadata binding module, and a business rule and workflow module, with all other modules 355 being run at the server 305. These examples are not limiting and other configurations of the modules 355 may be used in implementations.

The application development program 320 may include additional or fewer modules than those shown in FIG. 3. In embodiments, separate modules may be integrated into a single module. Additionally, or alternatively, a single module may be implemented as multiple modules. Moreover, the quantity of devices and/or networks in the environment is not limited to what is shown in FIG. 3. In practice, the environment may include additional devices and/or networks; fewer devices and/or networks; different devices and/or networks; or differently arranged devices and/or networks than illustrated in FIG. 3.

Figure 4A:
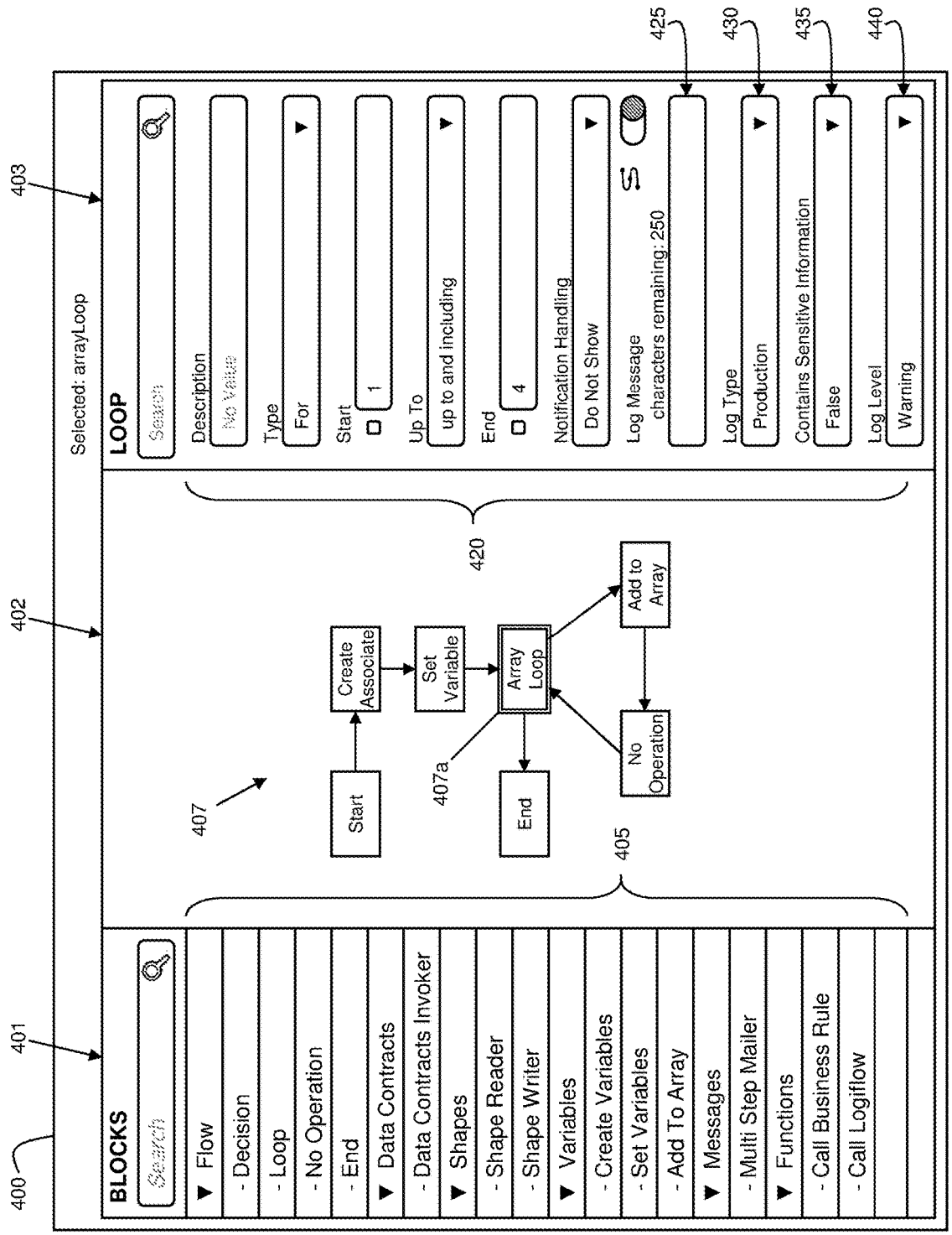

FIG. 4A shows an exemplary graphical user interface (UI) 400 for composing structured data objects using the application development program 320 of FIG. 3 in accordance with aspects of the disclosure. The UI 400 is an example of the UI 345 of FIG. 3 and is rendered by the client application 340 of FIG. 3 based on data received from the application development program 320 of FIG. 3. A user may provide input to the UI 400 utilizing one or more input devices of the client device 310 of FIG. 3, and the application development program 320 may modify (e.g., update what is displayed in) the UI 400 based on the user input.

As depicted, the UI 400 includes a first area 401, a second area 402, and a third area 403. In embodiments, the first area 401 includes a listing of blocks (e.g., tiles) 405, and the second area 402 includes a drop zone that includes a visual representation of a plurality of data nodes linked together to form a structured data object 407 according to a domain-specific language. In embodiments, dragging blocks from the first area 401 to the second area 402 appends the corresponding data nodes into the structured data object 407 according to the domain-specific language.

In embodiments, the third area 403 includes one or more parameter fields 420 associated with a selected one of the blocks in the structured data object 407 in the second area 402. In the example shown in FIG. 4A, the selected block 407a is the "Array Loop" block, and the third area 403 shows parameter fields 420 associated with the "Array Loop" block. In implementations, a respective set of parameter fields 420 is predefined (e.g., in the application development program 320) for each block in the listing of blocks 405. In this manner, the parameter fields 420 shown in the third area 403 change when the user selects a different block in the second area 402. For example, the parameter fields 420 shown in the example of FIG. 4A will change to a different set of parameter fields when the user selects a different block in the second area 402, e.g., if the user selects the "Add to Array" block instead of the "Array Loop" block.

The parameter fields 420 are input fields where the user provides input that defines values of predefined parameters associated with the selected block. The input provided by the user at these fields affects how the selected block functions in the structured data object 407. Aspects of the disclosure are described using the parameter fields 420 associated with the "Array Loop" block 407a as an example. However, aspects described herein may be used with parameter fields in other blocks not shown.

In the example shown in FIG. 4A, the parameter fields 420 associated with the "Array Loop" block 407a include, amongst others, a Log Message field 425, a Log Type field 430, a Contains Sensitive Information field 435, and a Log Level field 440. In this example, each of the Log Type field 430, Contains Sensitive Information field 435, and Log Level field 440 comprises a drop-down menu from which a user selects one of plural predefined options for the parameter of that respective field. In this example, the Log Message field 425 comprises a field by which a user may provide input to define a string and a variable (e.g., as shown in FIGS. 4B through 4I) or only a variable (as shown in FIGS. 4J through 4O).

FIGS. 4B through 4I illustrate aspects of a first embodiment of a parameter field as displayed in the UI 400 in accordance with aspects of the disclosure. In this embodiment, the parameter field is configured to permit a user to provide input that defines a static string and/or a dynamic variable. The user may provide the input by utilizing one or more input devices of the client device 310 of FIG. 3. An exemplary field of the UI 400 of FIG. 4A is used to illustrate aspects of this embodiment, although other fields may be configured to permit a user to provide input that defines a static string and/or a dynamic variable.

FIG. 4B shows aspects of the Log Message field 425 of FIG. 4A in this embodiment. As shown, the Log Message field 425 includes a title 440, a selectable parameter field 442, a characters remaining indicator 444, a mapping icon 446, and a log toggle switch 448. In this example, the parameter field 442 is a parameter field in which a user can enter a static string and/or a dynamic variable in accordance with aspects of the present disclosure. In this example, the characters remaining indicator 444 indicates a number of characters that a user can type in the parameter field 442. In this example, the mapping icon 446 opens a modal for the parameter field 442 as described at FIG. 4I. In this example, the log toggle switch 448 permits a user to selectively turn logging on and off for a stage of an application related to this parameter field 442 as described at FIGS. 5A and 5B.

FIG. 4C shows the parameter field 442 after the user has selected the parameter field 442 in the UI, e.g., by clicking their mouse pointer in the parameter field 442 or tabbing to the parameter field 442. In embodiments, a cursor 450 appears in the parameter field 442 when the parameter field 442 is selected.

FIG. 4D shows the parameter field 442 after the user has typed a static string 452 (e.g., "birthday date is") in the parameter field 442. In embodiments, the characters remaining indicator 444 changes as the user types characters in the parameter field 442, e.g., to show how many characters can still be typed in the field.

FIG. 4E shows the parameter field 442 after the user has typed an introductory character 454 following the static string 452. In embodiments, the introductory character 454 is a predefined character that the application development program 320 is programmed to recognize as triggering the input of a dynamic variable in the parameter field 442. In this example, the predefined character is a forward slash ("/") although implementations may be programmed to use a different character, such as a curly bracket ("{") for example.

Still referring to FIG. 4E, in embodiments, the system (e.g., the input and log module 355a) automatically shows a closing character 456 in the parameter field 442 in response to a user typing the introductory character 454 in the parameter field 442. In embodiments, the system shows the cursor 450 and a placeholder 458 between the introductory character 454 and the closing character 456 in the parameter field 442. In this example, the placeholder 458 is shaded text ("Type to Add"), although different placeholders may be used. In embodiments, the system also shows an icon 460 that opens a modal for this variable when selected by the user.

FIG. 4F shows the parameter field 442 after the user has started typing between the introductory character 454 and the closing character 456. In the example shown in FIG. 4F, the user has typed the beginning portion 462 ("employ") of a variable name with the cursor 450 between the introductory character 454 and the closing character 456. In embodiments, the system (e.g., the input and log module 355a) searches for variables that include the beginning portion 462. In embodiments, based on comparing the beginning portion 462 to names of variables defined in a library, the system displays a suggestion box 464 showing one or more variables with names that include the beginning portion 462. In embodiments, based on comparing the beginning portion 462 to names of variables defined in a library, the system displays a typeahead (also called autocomplete) suggestion 466 in the parameter field 442 between the cursor 450 and the closing character 456.

FIG. 4G shows the parameter field 442 while the user selects one of the variables in the suggestion box 464. In embodiments, the user may select one of the variables in the suggestion box 464 using their mouse and/or using arrow keys and the enter key of their keyboard. In embodiments, the system displays a highlight 468 of the selected one of the variables in the suggestion box 464.

FIG. 4H shows the parameter field 442 after any one of: the user selected one of the variables in the suggestion box 464 of FIG. 4G; the user accepted the typeahead suggestion 466 in FIG. 4F; the user selected a variable in the modal (described in FIG. 4I); and the user typed the entire name of the variable in the parameter field 442. In embodiments, after the user selects a variable in any of the above-described manners, the system moves the cursor 450 outside the closing character 456, and displays the static string 452 ("birthday date is") and the dynamic variable 470 ("employeeInfo.birthdayDate") in the parameter field 442. In this manner, the user may continue to provide input to enter another string or variable in the parameter field 442.

Still referring to FIG. 4H, in embodiments, the system permits the user to move the cursor 450 backward (e.g., using left arrow) into the area between the introductory character 454 and the closing character 456. In this manner, the user can modify the text between the introductory character 454 and the closing character 456, and the system responds in a manner similar to that shown in FIG. 4F by providing a suggestion box 464 and a typeahead suggestion 466 based on the modified text between the introductory character 454 and the closing character 456.

Figure 4I:
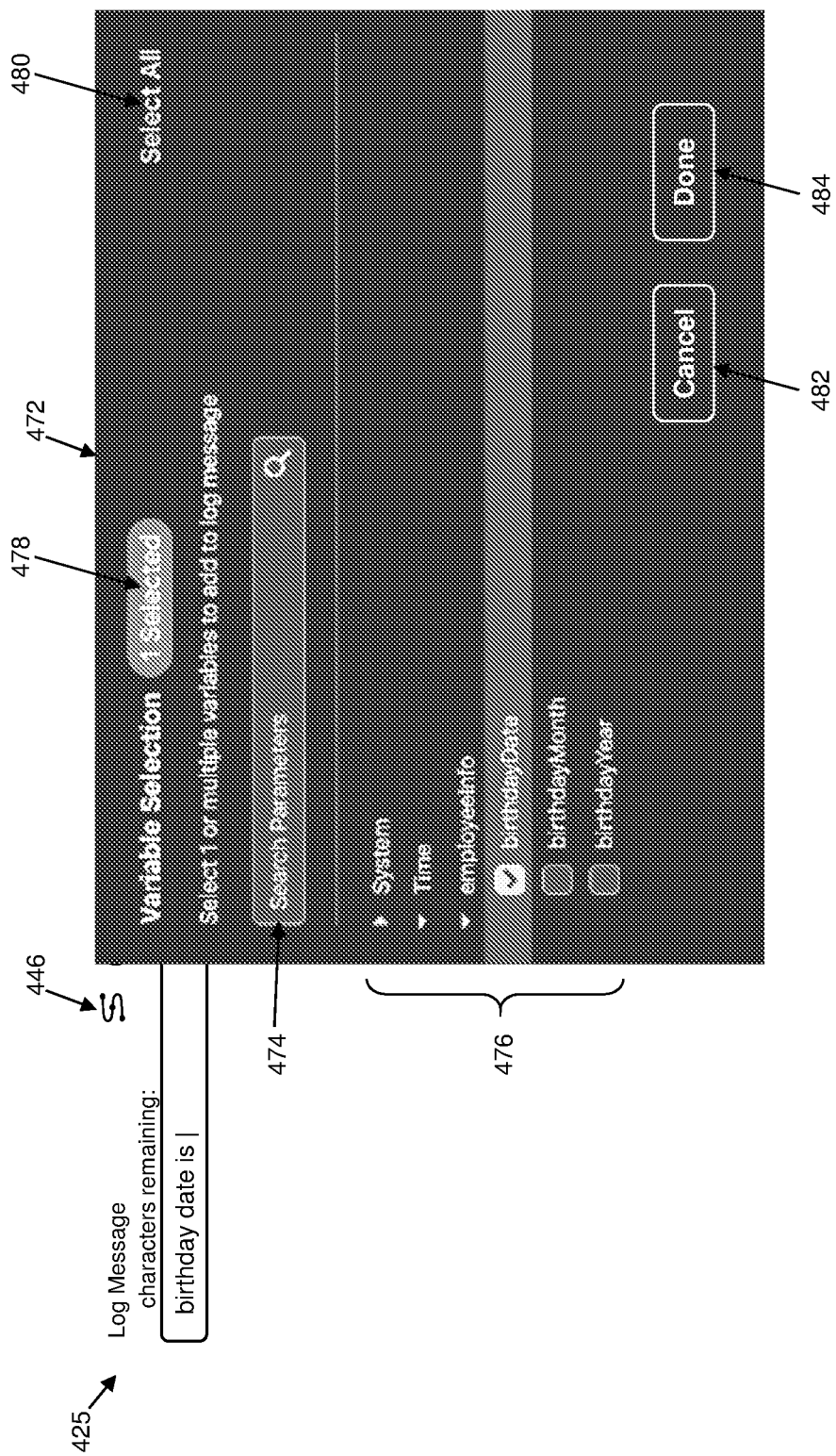

FIG. 4I shows a modal 472 that the system (e.g., the input and log module 355a) generates in response to the user selecting the mapping icon 446 associated with the parameter field 442. In embodiments, the modal 472 is a child window that is displayed in front of a main window of the UI 400, and that permits the user to select a variable to be inserted in the parameter field 442. In embodiments, the user must close the modal 472 in order to return to the main window of the UI 400.

In the example shown in FIG. 4I, the modal 472 includes a search field 474 that permits a user to type search terms for variables to be entered into the parameter field 442. In this example, the modal 472 also includes a hierarchy structure 476 of variables that the user can navigate and select to be entered into the parameter field 442. The user may select one or more variables from the hierarchy structure 476. In this example, the modal 472 includes a "Select All" button that selects all the variables in the hierarchy structure 476. In this example, the modal 472 includes an indicator 478 of a number of variables selected in the hierarchy structure 476, a "Cancel" button 482, and a "Done" button 484.

In embodiments, and still referring to FIG. 4I, when the user selects the "Done" button 484, the system inserts all variables that are currently selected (e.g., in the hierarchy structure 476) into the parameter field 442 and closes the modal 472. In the example shown in FIG. 4I, the user has selected the variable "employeeInfo.birthdayDate" in the hierarchy structure 476. In this example, in response to the user selecting the "Done" button 484, the system closes the modal 472 and reverts back to the main window of the UI 400 with the selected variable shown in the parameter field 442 as shown in FIG. 4H.

FIGS. 4J through 4O illustrate aspects of a second embodiment of a parameter field as displayed in the UI 400 in accordance with aspects of the disclosure. In this embodiment, the parameter field is configured to permit a user to provide input that defines a dynamic variable but not a static string. An exemplary field of the UI 400 of FIG. 4A is used to illustrate aspects of this embodiment, although other fields may be configured to permit a user to provide input that defines a static string and/or a dynamic variable.

Figure 4J:
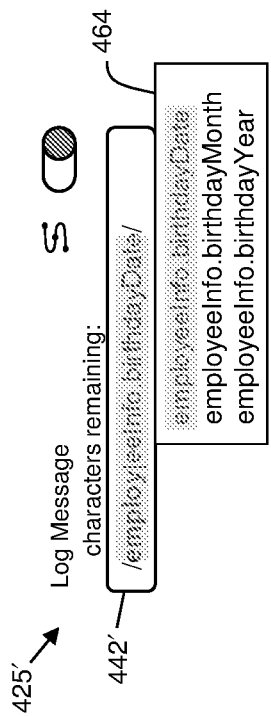

FIG. 4J shows aspects of the Log Message field 425' of FIG. 4A in this embodiment. As shown, the Log Message field 425' includes a title 440, a selectable parameter field 442', a characters remaining indicator 444, a mapping icon 446, and a log toggle switch 448. In this example, the parameter field 442' is a parameter field in which a user can enter a dynamic variable but not a static string. The title 440, characters remaining indicator 444, mapping icon 446, and log toggle switch 448 all function in the same manner as described with respect to FIGS. 4B-4I.

In the embodiment shown in FIG. 4J, because the parameter field 442' is configured to only receive a dynamic variable (and cannot receive a static string), the system automatically displays the introductory character 454 and the closing character 456 in the parameter field 442' without requiring the user to type the introductory character 454. In this manner, the user can quickly and easily differentiate between the parameter field 442 (that accepts both string and variable) and the parameter field 442' (that accepts only variable).

Figure 4K:

FIG. 4K shows the parameter field 442' after the user has selected the parameter field 442', e.g., by clicking their mouse pointer in the parameter field 442' or tabbing to the parameter field 442'. In embodiments, a cursor 450 appears in the parameter field 442' between the introductory character 454 and the closing character 456 when the parameter field 442' is selected.

Figure 4L:
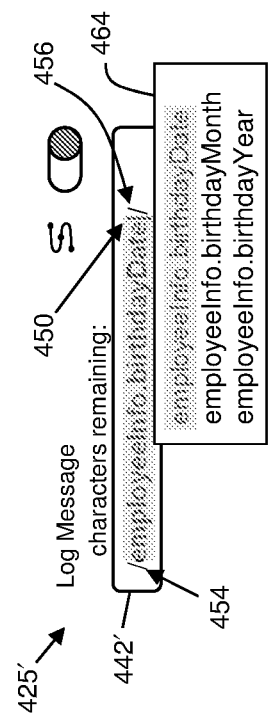

FIG. 4L shows the parameter field 442' after the user has started typing between the introductory character 454 and the closing character 456. The system operates similar to the operation described at FIG. 4F but without a static string in the parameter field 442'.

Figure 4M:
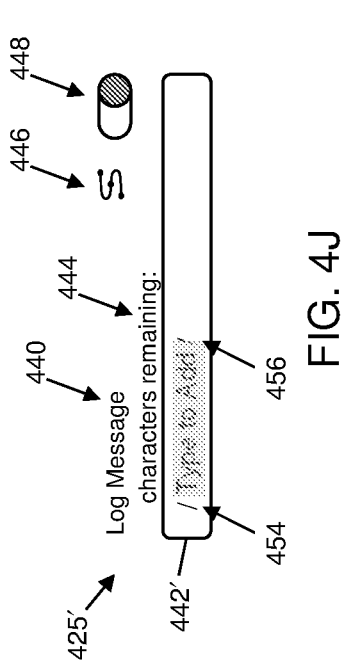

FIG. 4M shows the parameter field 442' while the user selects one of the variables in the suggestion box 464. The system operates similar to the operation described at FIG. 4G but without a static string in the parameter field 442'.

Figure 4N:
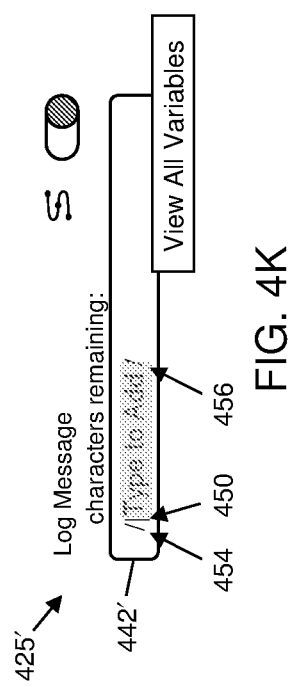

FIG. 4N shows the parameter field 442' after the user has completed entry of the variable in any of the described manners. The system operates similar to the operation described at FIG. 4H but without a static string in the parameter field 442'.

Figure 4O:
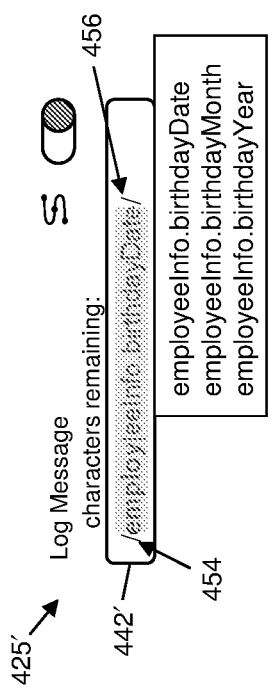

FIG. 4O shows the parameter field 442' after the user has moved the cursor 450 backward (e.g., using left arrow) into the area between the introductory character 454 and the closing character 456. In this manner, the user can modify the text between the introductory character 454 and the closing character 456, and the system responds by providing a suggestion box 464 and a typeahead suggestion 466 based on the modified text between the introductory character 454 and the closing character 456.

Figure 5A:
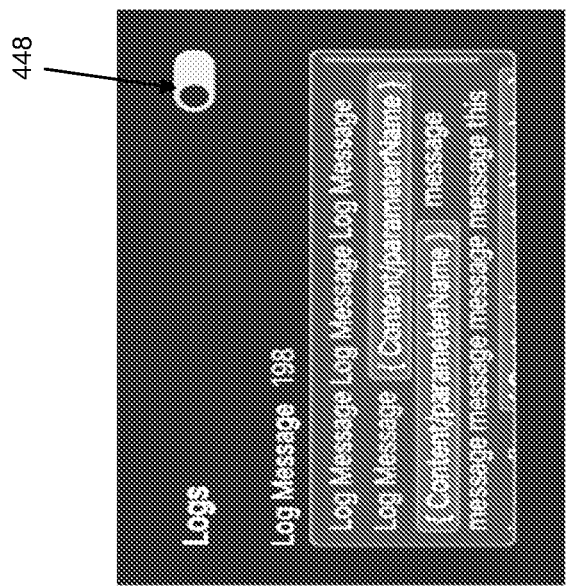
Figure 5B:
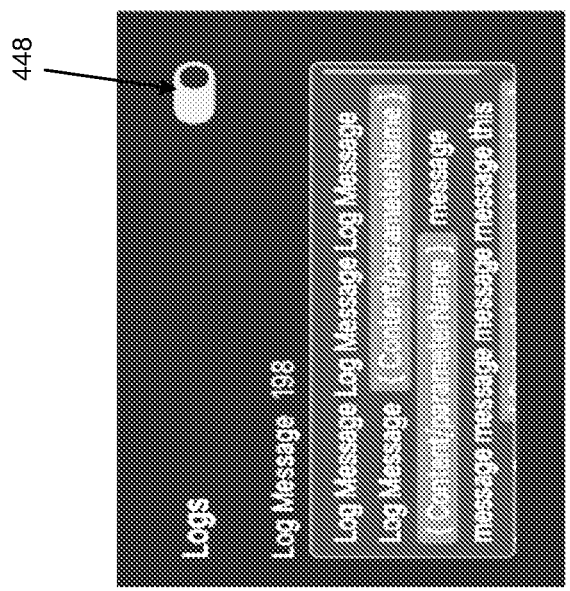

FIGS. 5A and 5B show an exemplary operation of the log toggle switch 448 of the UI 400 in accordance with embodiments. FIG. 5A shows the log toggle switch 448 in a first (ON) position, and FIG. 5B shows the log toggle switch 448 in a second (OFF) position. It should be understood that other mechanisms may also be implemented and that the toggle switch is but one non-limiting illustrative example. The user may provide input to the UI 400 to selectively move the log toggle switch 448 to one of the ON position and the OFF position.

Selecting the ON position creates an active log state for this stage of the application related to the parameter field 442. In the active log state, the system generates log data in the log table for this stage of the application when the application is run during a debug process. Selecting the OFF position creates an inactive log state for this stage of the application related to the parameter field 442. In the inactive log state, the system does not generate log data in the log table for this stage of the application when the application is run during a debug process. However, although a stage might be in the inactive state, the system still generates log data in the log table for other stages of the application that are in the active state when the application is run during a debug process.

Figure 6:
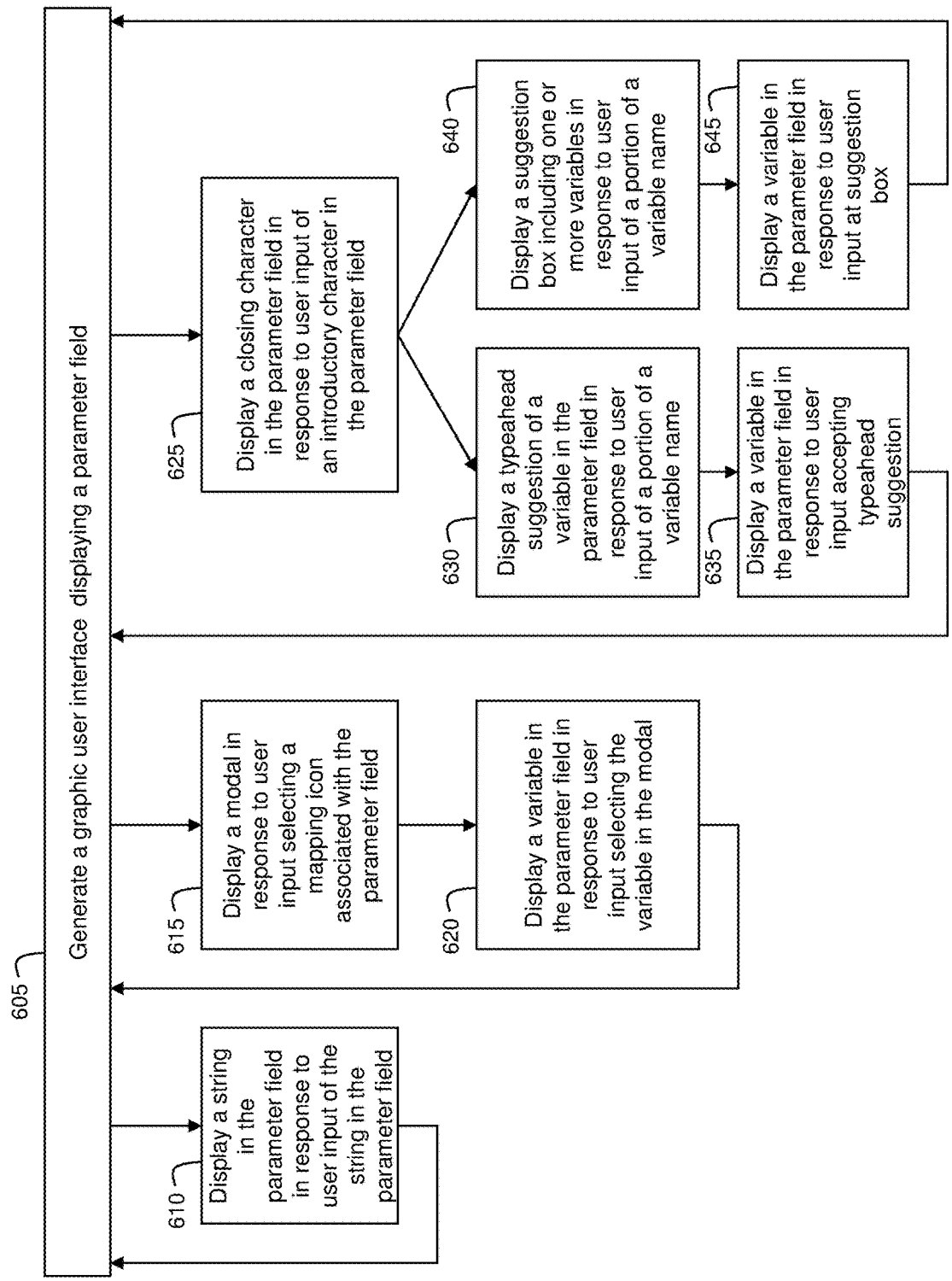
Figure 7:
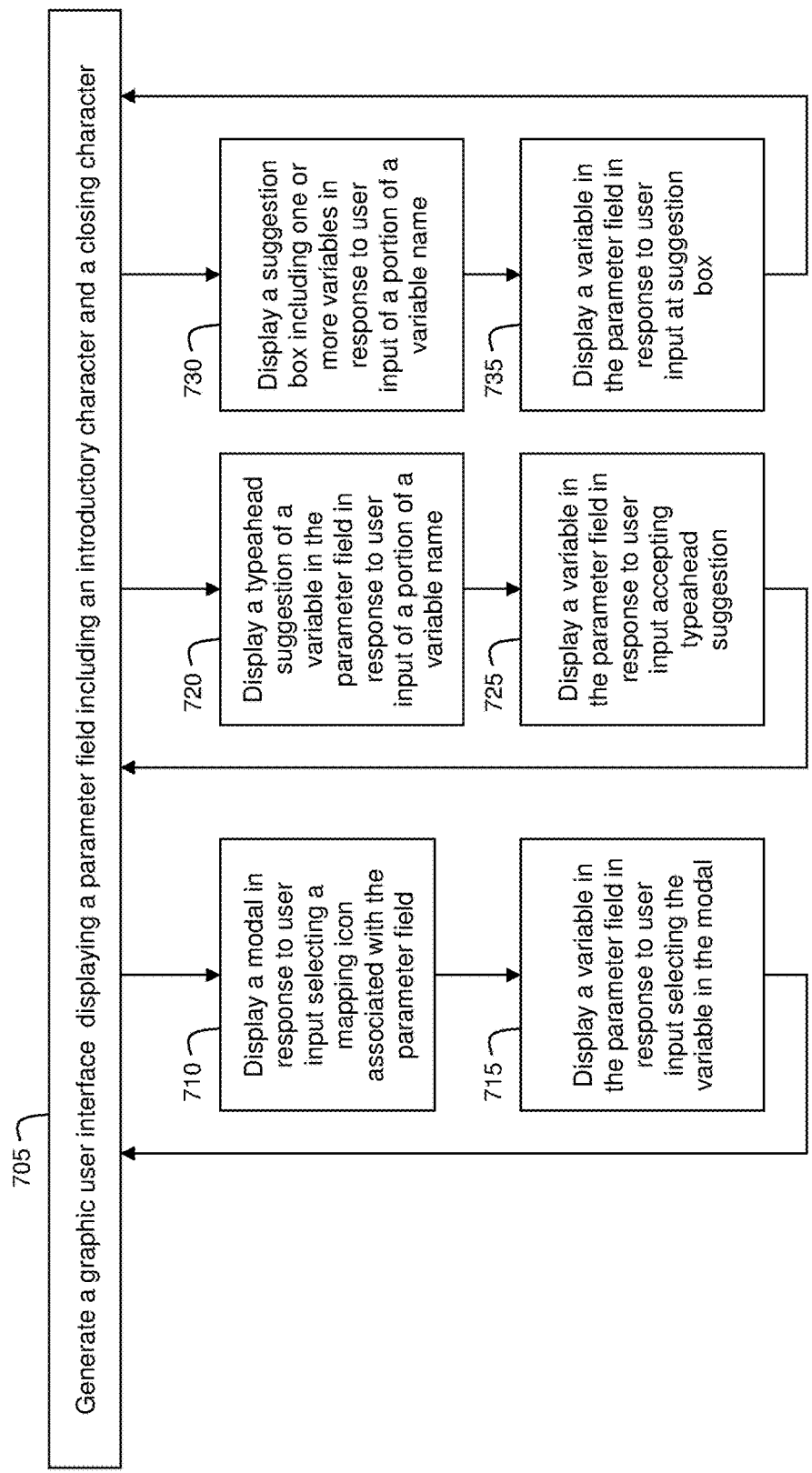

FIGS. 6 and 7 depict exemplary flows for processes in accordance with aspects of the present disclosure. The exemplary flows can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method and/or computer program product implementing the flow of FIG. 6 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

FIG. 6 shows a flowchart of an exemplary method in accordance with aspects of the present invention. Steps of the method may be carried out in the environment of FIG. 3 and are described with reference to elements depicted in FIG. 3.

At step 605, the system generates a graphic user interface displaying a parameter field. In embodiments, and as described herein, the application development program 320 generates data that defines a graphic user interface that is displayed on the client device 310. In embodiments, the graphic user interface is the UI 400 of FIG. 4A and includes: a first area including a list of blocks; a second area including a structured data object comprising nodes corresponding to one or more of the blocks; and a third area including a parameter field of a selected one of the nodes, wherein the parameter field is configured to receive user input defining both a static string and a dynamic variable. Step 605 may include the application development program 320 modifying the graphic user interface based on user input received at the client device 310. For example, the application development program 320 may modify (e.g., update) the graphic user interface based on the user dragging and dropping a block from the first area to the second area. In another example, the application development program 320 may modify (e.g., update) the graphic user interface based on the user selecting a node in the second area.

At step 610, the system displays a string in the parameter field in response to user input of the string in the parameter field. In embodiments, and as described at FIG. 4D, the application development program 320 modifies (e.g., updates) the graphic user interface based on the user typing a string in the parameter field.

At step 615, the system displays a modal in response to user input selecting a mapping icon associated with the parameter field. In embodiments, and as described at FIG. 4I, the application development program 320 modifies (e.g., updates) the graphic user interface to display the modal in which a user may select a variable for the parameter field.

At step 620, the system displays a variable in the parameter field in response to user input selecting the variable in the modal. In embodiments, and as described at FIGS. 4I and 4H, the application development program 320 modifies (e.g., updates) the graphic user interface to display, in the parameter field, a variable that the user selected in the modal.

At step 625, the system displays a closing character in the parameter field in response to user input of an introductory character in the parameter field. In embodiments, and as described at FIG. 4E, the application development program 320 modifies (e.g., updates) the graphic user interface to display the closing character in the parameter field.

At step 630, the system displays a typeahead suggestion of a variable in the parameter field in response to user input of a portion of a variable name. In embodiments, and as described at FIG. 4F, the application development program 320 modifies (e.g., updates) the graphic user interface to display the typeahead suggestion in the parameter field.

At step 635, the system displays a variable in the parameter field in response to user input accepting the typeahead suggestion. In embodiments, and as described at FIGS. 4F and 4H, the application development program 320 modifies (e.g., updates) the graphic user interface to display a variable in the parameter field.

At step 640, the system displays a suggestion box including one or more variables in response to user input of a portion of a variable name. In embodiments, and as described at FIG. 4F, the application development program 320 modifies (e.g., updates) the graphic user interface to display the suggestion box.

At step 645, the system displays a variable in the parameter field in response to user input at the suggestion box. In embodiments, and as described at FIGS. 4G and 4H, the application development program 320 modifies (e.g., updates) the graphic user interface to display a variable in the parameter field.

FIG. 7 shows a flowchart of an exemplary method in accordance with aspects of the present invention. Steps of the method may be carried out in the environment of FIG. 3 and are described with reference to elements depicted in FIG. 3.

At step 705, the system generates a graphic user interface displaying a parameter field. In embodiments, and as described herein, the application development program 320 generates data that defines a graphic user interface that is displayed on the client device 310. In embodiments, the graphic user interface is the UI 400 of FIG. 4A and includes: a first area including a list of blocks; a second area including a structured data object comprising nodes corresponding to one or more of the blocks; and a third area including a parameter field of a selected one of the nodes, wherein the parameter field includes an introductory character and a closing character indicating that the parameter field is configured to receive only user input defining a dynamic variable. Step 705 may include the application development program 320 modifying the graphic user interface based on user input received at the client device 310. For example, the application development program 320 may modify (e.g., update) the graphic user interface based on the user dragging and dropping a block from the first area to the second area. In another example, the application development program 320 may modify (e.g., update) the graphic user interface based on the user selecting a node in the second area.

At step 710, the system displays a modal in response to user input selecting a mapping icon associated with the parameter field. In embodiments, and as described at FIG. 4I, the application development program 320 modifies (e.g., updates) the graphic user interface to display the modal in which a user may select a variable for the parameter field.

At step 715, the system displays a variable in the parameter field in response to user input selecting the variable in the modal. In embodiments, and as described at FIGS. 4I and 4N, the application development program 320 modifies (e.g., updates) the graphic user interface to display a variable in the parameter field that the user selected in the modal.

At step 720, the system displays a typeahead suggestion of a variable in the parameter field in response to user input of a portion of a variable name. In embodiments, and as described at FIG. 4L, the application development program 320 modifies (e.g., updates) the graphic user interface to display the typeahead suggestion in the parameter field.

At step 725, the system displays a variable in the parameter field in response to user input accepting the typeahead suggestion. In embodiments, and as described at FIGS. 4L and 4N, the application development program 320 modifies (e.g., updates) the graphic user interface to display a variable in the parameter field.

At step 730, the system displays a suggestion box including one or more variables in response to user input of a portion of a variable name. In embodiments, and as described at FIG. 4L, the application development program 320 modifies (e.g., updates) the graphic user interface to display the suggestion box.

At step 735, the system displays a variable in the parameter field in response to user input at the suggestion box. In embodiments, and as described at FIGS. 4M and 4N, the application development program 320 modifies (e.g., updates) the graphic user interface to display a variable in the parameter field.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for modifying a structured data object, comprising:
generating, by a data processing system comprising a processor coupled with memory, a pictorial representation of the structured data object comprising a plurality of linked data nodes;
receiving, by the data processing system, a selection of a linked data node of the plurality of linked data nodes from the pictorial representation;
providing, for display on a display device, by the data processing system, a parameter field defined for the selected linked data node, wherein the parameter field is a log message field;
determining, by the data processing system, that the parameter field for the selected linked data node accepts as input a string and a variable;
receiving, by the data processing system, a string input for the parameter field through a typed input, the string input defining a variable input for the parameter field of the selected linked data node;
receiving, by the data processing system, a first typed character indicating the variable input;
providing, by the data processing system responsive to receiving the first typed character, a list of variables for display on the display device;
receiving, by the data processing system, a first selection of the variable input from the list of variables;
receiving, by the data processing system, a second selection to log the parameter field of the selected linked data node;
executing, by the data processing system, the structured data object according to the pictorial representation;
generating, by the data processing system responsive to executing the structured data object and the second selection to log the parameter field, log data for the parameter field; and
providing, by the data processing system for display on the display device, the log data comprising the variable input selected from the list of variables and the string input in a log table.

2. The method of claim 1, wherein receiving the string input and the variable input for the parameter field comprises:
receiving, by the data processing system, a third selection, from the pictorial representation, of two or more variable inputs to associate with the string input.

3. The method of claim 1, comprising:
determining, by the data processing system, that a second parameter field does not accept the string;
receiving, by the data processing system, responsive to determining that the second parameter field does not accept the string, a second variable input;
receiving, by the data processing system, a third selection to log the second parameter field;
executing, by the data processing system responsive to receiving a second request, the structured data object according to the pictorial representation;
generating, by the data processing system responsive to executing the structured data object, second log data for the second parameter field; and
displaying, by the data processing system on the display device, the second log data comprising the second variable input in the log table.

4. The method of claim 1, wherein generating the pictorial representation of the structured data object comprises:
receiving, by the data processing system, a third selection comprising a location and blocks, the blocks corresponding to the plurality of linked data nodes;
aligning, by the data processing system responsive to receiving the selection of the blocks, the blocks in the pictorial representation according to the selection; and
displaying, by the data processing system on the display device, the structured data object comprising the plurality of linked data nodes in the pictorial representation.

5. The method of claim 1, wherein each linked data node of the plurality of linked data nodes comprises a different set of parameter fields.

6. The method of claim 1, wherein the structured data object is executed in a low-code environment.

7. The method of claim 1, wherein the structured data object comprising the plurality of linked data nodes is generated according to a domain-specific language.

8. The method of claim 1, comprising:
receiving, by the data processing system, a third selection to remove a second parameter field from logging;
executing, by the data processing system responsive to receiving a second request, the structured data object according to the pictorial representation; and
displaying, by the data processing system coupled with the display device, the log data comprising the variable input and the string input in a second log table for the parameter field.

9. A system for modifying a structured data object, comprising a data processing system comprising a processor coupled with memory, the data processing system to:
generate a pictorial representation of the structured data object comprising a plurality of linked data nodes;
receive, a selection of a linked data node of the plurality of linked data nodes from the pictorial representation;
provide, for display on a display device, a parameter field defined for the selected linked data node, wherein the parameter field is a log message field;
determine that the parameter field for the selected linked data node accepts as input a string and a variable;
receive a string input for the parameter field through a typed input, the string input defining a variable input for the parameter field of the selected linked data node;
receive a first typed character indicating the variable input;
provide, responsive to receiving the first typed character, a list of variables for display on the display device;
receive a first selection of the variable input form the list of variables;
receive, a second selection to log the parameter field of the selected linked data node;
execute the structured data object according to the pictorial representation;
generate, responsive to executing the structured data object and the second selection to log the parameter field, log data for the parameter field; and
provide, for display on the display device, the log data comprising the variable input and the string input in a log table.

10. The system of claim 9, comprising the data processing system to:
determine that a second parameter field does not accept the string;
receive, responsive to determining that the second parameter field does not accept the string, a second variable input;
receive, a third selection to log the second parameter field;
execute, responsive to receiving a second request, the structured data object according to the pictorial representation;
generate, responsive to executing the structured data object, second log data for the second parameter field; and
display, with the display device, the second log data comprising the second variable input in the log table.

11. The system of claim 9, wherein generating the pictorial representation of the structured data object comprises the data processing system to:
receive a third selection comprising a location and blocks, the blocks corresponding to the plurality of linked data nodes;
align, responsive to receiving the selection of the blocks, the blocks in the pictorial representation according to the selection; and
display, with the display device, the structured data object comprising the plurality of linked data nodes in the pictorial representation.

12. The system of claim 9, wherein the structured data object is executed in a low-code environment.

13. The system of claim 9, wherein the structured data object comprising the plurality of linked data nodes is generated according to a domain-specific language.

14. The system of claim 9, comprising the data processing system to:
receive, a third selection to remove a second parameter field from logging;
execute, responsive to receiving a second request, the structured data object according to the pictorial representation; and
display, with the display device, the log data comprising the variable input and the string input in a second log table for the parameter field.

15. A non-transitory computer-readable medium, comprising instructions embodied thereon, the instructions to cause one or more processors to:
generate a pictorial representation of a structured data object comprising a plurality of linked data nodes;
receive, a selection of a linked data node of the plurality of linked data nodes from the pictorial representation;
provide, for display on a display device, a parameter field defined for the selected linked data node, wherein the parameter field is a log message field;
determine that the parameter field for the selected linked data node accepts as input a string and a variable;
receive a string input for the parameter field through a typed input, the string input defining a variable input for the parameter field of the selected linked data node;
receive a first typed character indicating the variable input;
provide, responsive to receiving the first typed character, a list of variables for display on the display device;
receive a first selection of the variable input form the list of variables;
receive a second selection to log the parameter field of the selected linked data node;
execute the structured data object according to the pictorial representation;
generate, responsive to executing the structured data object and the second selection to log the parameter field, log data for the parameter field; and
provide, for display on the display device, the log data comprising the variable input and the string input in a log table.

16. The non-transitory computer-readable medium of claim 15, comprising the instructions to cause the one or more processors to:
determine that a second parameter field does not accept the string;
receive, responsive to determining that the second parameter field does not accept the string, a second variable input;
receive, a third selection to log the second parameter field;
execute, responsive to receiving a second request, the structured data object according to the pictorial representation;
generate, responsive to executing the structured data object, second log data for the second parameter field; and display, with the display device, the second log data comprising the second variable input in the log table.

* * * * *